June 22, 1926.

C. W. WOODSON

BEET HARVESTER

Filed Oct. 31, 1922

Inventor
CHARLES W. WOODSON

By
Attorney

June 22, 1926.

C. W. WOODSON 1,589,502

BEET HARVESTER

Filed Oct. 31, 1922

Inventor
CHARLES W. WOODSON

By Ch. Harken
Attorney

Patented June 22, 1926.

1,589,502

UNITED STATES PATENT OFFICE.

CHARLES W. WOODSON, OF LOS ANGELES, CALIFORNIA.

BEET HARVESTER.

Application filed October 31, 1922. Serial No. 598,136.

This invention relates to beet harvesters, and is an improvement over the construction described and claimed in my prior Patent No. 1,405,885, granted February 7th, 1922.

An object of the present invention is the provision of improved means for topping the beets after they have been lifted from the ground.

In the present invention, I provide suitable beet lifters, a conveyor adapted to carry the beets upwardly from the ground, and an evening device adapted to properly position the beets as they are fed to the knives which sever the tops from the beets.

The evener consists of pairs of endless chains traveling parallel to each other, the lower chains being spaced to form guides for the beet tops, and the upper chains being arranged relatively close to each other to frictionally grasp the beet tops and draw them upwardly. This upward movement is limited by the lower chains which prevent the beet from moving upwardly beyond a certain point and properly position the beet to be separated from the beet top.

In the accompanying drawings, I have shown one embodiment of the invention. In this showing:

Figure 5 is a detail view showing a portion of the drive mechanism, and,

Figure 6 is a vertical sectional view on line 6—6 of Figure 1.

Figure 1:
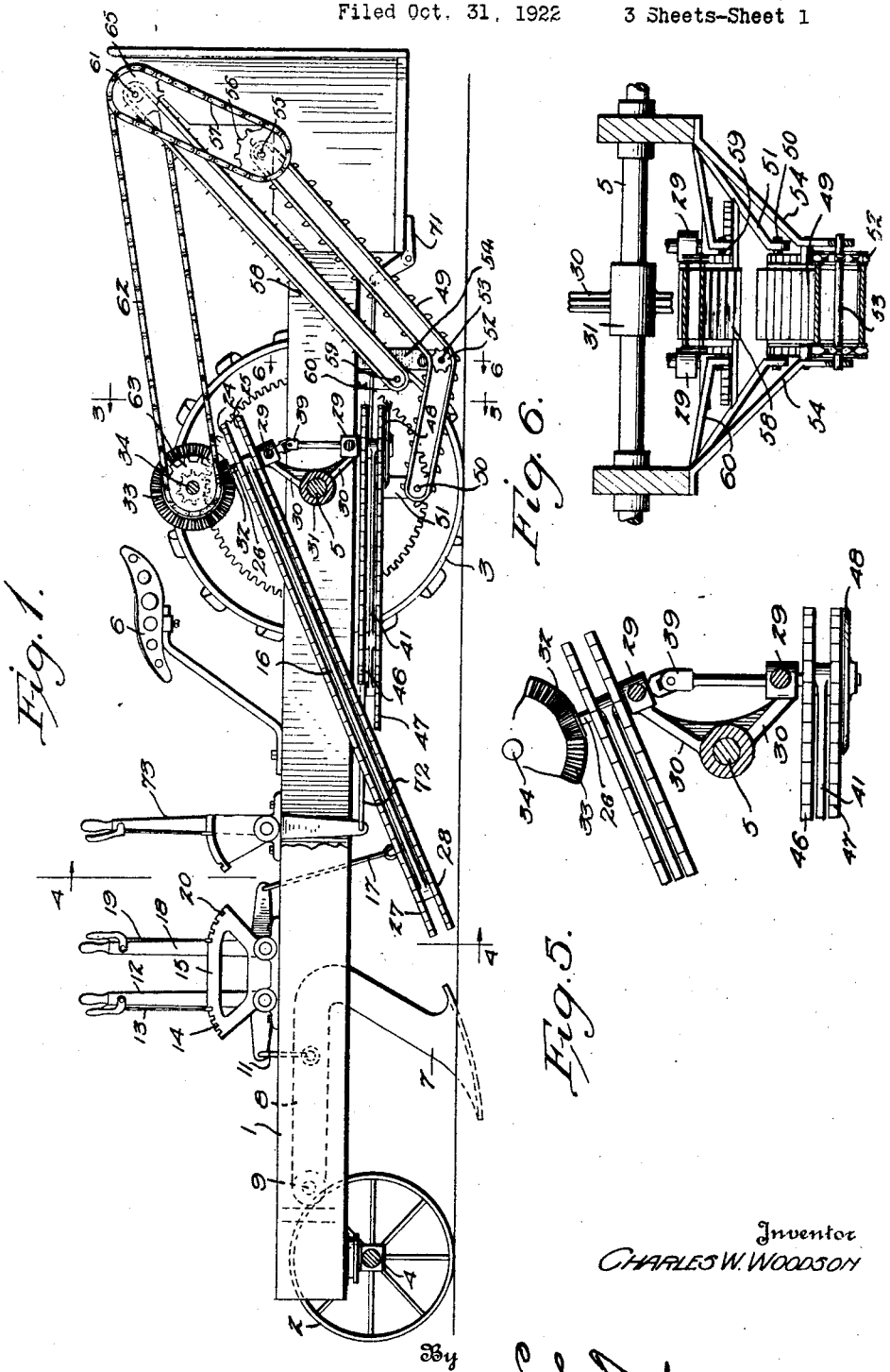
Figure 1 is a side elevation.
Figure 2:
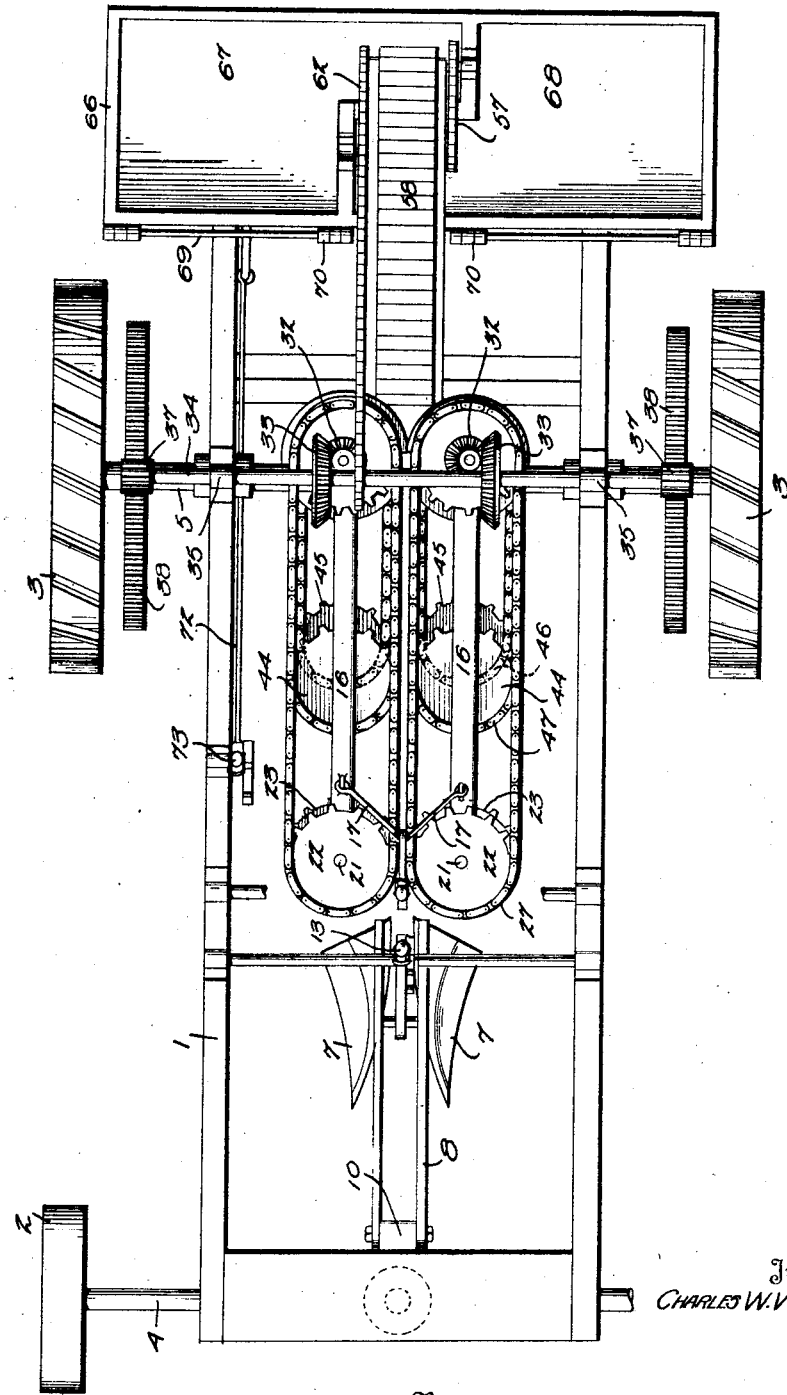
Figure 2 is a plan view.
Figure 3:
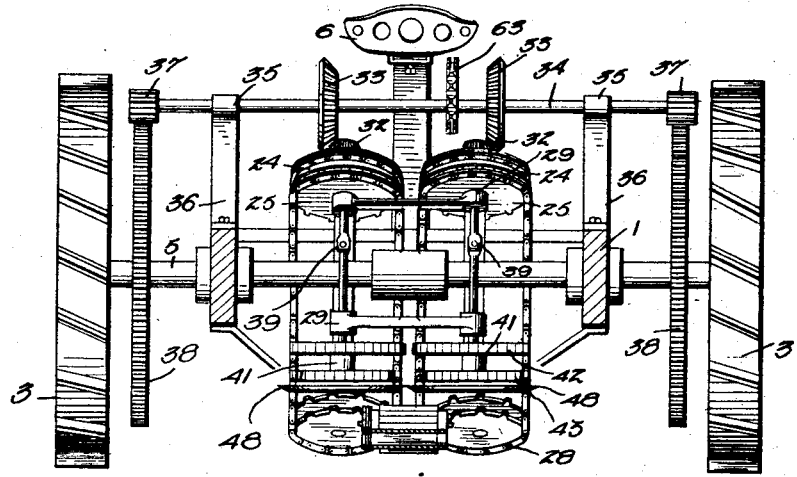
Figure 3 is a vertical sectional view on line 3—3 of Figure 1.
Figure 4:
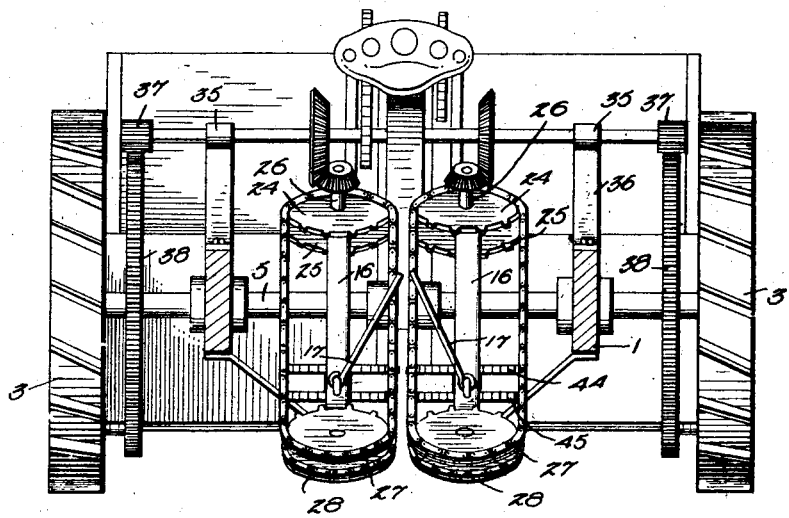
Figure 4 is a vertical sectional view on line 4—4 of Figure 1.

Referring to the drawings, the reference numeral 1 designates generally a vehicle frame which is provided with front wheels 2 and rear wheels 3. The front wheels are mounted on an axle 4 and are provided with suitable steering means (not shown). The rear wheels are mounted on an axle 5. The vehicle is provided with an operator's seat 6. A pair of plows 7 are disposed near the front of the vehicle and are adapted to lift the beets in the usual manner. As shown, these plows are provided with beams 8, pivotally mounted on a pin 9, received in a bracket 10 adjacent the front of the frame. Adjusting links 11 are secured to the plow beams and the upper ends of these links are secured to the offset end of a control lever 12. As shown, the control lever is provided with a locking device 13 adapted to engage notches 14 on a quadrant 15. It will be apparent that by the means disclosed, the plows or beet lifters may be adjusted to cut any desired depth and are securely held in adjusted position.

A pair of inclined conveyor frames 16 are arranged at each side of the center of the machine. The rear ends of these frames are supported in a manner to be hereinafter described, and the forward ends are secured to links 17. The upper ends of these links are connected to a control lever 18 which is provided with suitable locking means 19, engaging notches 20 in the quadrant 15. The conveyor frames are provided with forward shafts 21, adapted to receive upper and lower sprocket wheels 22 and 23. Rear sprocket wheels 24 and 25 are arranged on the shafts 26. Chains 27 and 28 are passed over these sprocket wheels and the revolution of the shafts 26 causes the chains to travel around the sprocket wheels. The shafts 26 are supported in suitable bearings 29. These bearings are arranged on the ends of arms 30, secured to a collar 31, surrounding the rear axle. Each of these shafts is provided with a bevel gear 32, meshing with bevel gears 33 on a transverse shaft 34. The shaft 34 is mounted in bearings 35, carried by arms 36, secured to the frame in any suitable manner, and this shaft is provided with a pair of pinions 37, meshing with gears 38, carried by the axle 5. An evening device is mounted on the lower end of each of the shafts 26. As shown, these shafts are provided with universal joints 39 and the lower portions thereof are vertically disposed. The evening devices consist of frames 41, similar in construction to the frames of the conveyors. A pair of sprocket wheels 42 and 43 are arranged on the lower ends of shafts 26 above and below the conveyor frames 41. As shown, the upper sprocket wheels 42 are of greater diameter than the lower sprocket wheels whereby the space between the upper sprocket wheels is less than the space between the lower sprocket wheels. Similar sprocket wheels 44 and 45 are arranged at the front of each of the frames 41 and chains 46 and 47 are passed over these sprocket wheels. A beet topper consisting of a disk 48 having a cutting edge is arranged on each of the shafts 26 beneath the chains 47.

Means are provided for conveying beets and beet tops to suitable receptacles mounted on the rear of the frame. A conveyor 49 is arranged beneath the cutting disks 48, the forward end of the conveyor being supported on a shaft 50, mounted in suitable brackets 51, carried by the frame. The forward portion of the conveyor extends downwardly and passes over sprockets 52, mounted on a shaft 53, supported in suitable brackets 54. The conveyor is provided with an upwardly inclining stretch passing over a shaft 55, arranged at the rear of the machine. This shaft is provided with suitable sprockets 56 adapted to receive a driven chain 57. A second conveyor 58 is arranged over the beet conveyor and is adapted to receive the beet tops. As shown, the lower end of this conveyor passes over a shaft 59, supported in suitable brackets 60, and the upper end passes over a shaft 61. The shaft 61 is provided with a sprocket wheel adapted to receive a chain 62, passing over a sprocket wheel 63 on the transverse shaft 34 to drive it, and is in turn provided with a sprocket 65 which is adapted to receive the chain 57 to drive the shaft 55.

A box 66 is mounted on the rear of the machine and is provided with a pair of frames 67 and 68. The conveyor 58 passes over the compartment 67 to deliver the tops thereto, and the conveyor 49 passes over the compartment 68 to deliver the beets thereto. This box is pivotally mounted on the frame by means of a shaft 69, received in suitable bearings 70. It is normally retained in raised position by a locking member 71 and this locking member is controlled by a rod 72, extending forwardly of the machine and connected to a control lever 73.

In operation, the beets are lifted from the ground in the usual manner by the beet lifter 7, which as stated, may be adjusted to any desired depth. The conveyor chains 27 and 28 then engage the beet tops and carry them upwardly. The beets are removed from the conveyor chains 27 and 28 by the chains 46 and 47. As stated, the upper chains 46 of the evening device are located closer to each other than the lower chains and, when they grasp the beet tops, they tend to draw the beets upwardly. The beets are drawn rearwardly but the upward movement is limited by the chains 47 which are spaced sufficiently close to each other to prevent the beet from passing between the chains. This properly arranges the beets for the topping operation, and insures the removal of the entire top by the disks 48. The beets and tops are then conducted to the receptacles 68 and 67 respectively, by the conveyors 49 and 58. When the field has been harvested, or when the receptacles 67 and 68 are filled, the box 66 may be dumped by releasing the lever 73.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. In a beet harvester, means for lifting beets from the ground, an inclined conveyor consisting of a pair of chains adapted to grasp the lifted beets and convey them upwardly and rearwardly, an evening device consisting of upper and lower pairs of conveyor chains, the upper pair of chains being arranged relatively close to each other to grasp the beet tops and draw them rearwardly, the lower set of chains being spaced from each other a greater distance than said upper chains and adapted to form guides to limit the upward movement of the beets, said upper and lower chains extending to points in proximity to said inclined conveyor, a pair of revolving cutting disks arranged adjacent the rear end of said evening device to sever the beet tops, and means for collecting the separated beets and tops and delivering them to separate receptacles.

2. In a beet harvester, an inclined conveyor adapted to convey beets upwardly and rearwardly, an evening device consisting of upper and lower pairs of conveyor chains, the upper pairs of chains being arranged relatively close to each other to grasp the beet tops and draw them rearwardly, the lower set of chains being spaced from each other a greater distance than said upper chains and adapted to form guides to limit the upward movement of the beets, said upper and lower chains extending to points in proximity to said inclined conveyor, said lower chains extending forwardly a greater distance than said upper chains, and cutting means arranged adjacent the rear end of said evening device beneath said lower chains to sever the beet tops.

3. In a beet harvester, an inclined conveyor consisting of a pair of chains adapted to grasp the beets and convey them upwardly and rearwardly, an evening device consisting of upper and lower pairs of conveyor chains, the upper pair of chains being arranged relatively close to each other to grasp the beet tops and draw them rearwardly, the lower set of chains being spaced from each other a greater distance than said upper chains and adapted to form guides to limit the upward movement of the beets, said upper and lower chains extending to points in proximity to said inclined conveyor, said lower chains projecting forwardly a greater distance than said upper chains, and a pair of revolving cutting disks arranged adjacent the rear end of said evening device beneath the lower chains thereof to sever the beet tops.

In testimony whereof I affix my signature.

CHARLES W. WOODSON.